US007900648B2

(12) United States Patent
Rouxel et al.

(10) Patent No.: US 7,900,648 B2
(45) Date of Patent: Mar. 8, 2011

(54) VALVE FOR THE VENTING CIRCUIT OF A LIQUID TANK

(75) Inventors: Thierry Rouxel, Argentre (FR); Vincent Cuvelier, Brussels (BE)

(73) Assignee: Inergy Automotive Systems Research (Societe Anonyme), Brussels (BE)

( * ) Notice: Subject to any disclaimer, the term of this patent is extended or adjusted under 35 U.S.C. 154(b) by 160 days.

(21) Appl. No.: 11/920,844

(22) PCT Filed: May 22, 2006

(86) PCT No.: PCT/EP2006/062479
§ 371 (c)(1),
(2), (4) Date: Jun. 11, 2008

(87) PCT Pub. No.: WO2006/125758
PCT Pub. Date: Nov. 30, 2006

(65) Prior Publication Data
US 2009/0165869 A1    Jul. 2, 2009

(30) Foreign Application Priority Data
May 24, 2005   (FR) ...................................... 05 05195

(51) Int. Cl.
*F16K 24/04*   (2006.01)
(52) U.S. Cl. .......................................... 137/202; 137/43
(58) Field of Classification Search .................. 137/202, 137/409, 43; 251/127
See application file for complete search history.

(56) References Cited

U.S. PATENT DOCUMENTS

| 4,646,772 A | * | 3/1987 | Bergsma .......................... 137/39 |
| 4,982,757 A | | 1/1991 | Ohasi et al. |
| 5,028,244 A | | 7/1991 | Szlaga |
| 5,439,023 A | | 8/1995 | Horikawa |
| 5,687,753 A | * | 11/1997 | Doll ................................. 137/43 |
| 5,782,258 A | | 7/1998 | Herbon et al. |
| 5,944,044 A | | 8/1999 | King et al. |
| 5,950,655 A | | 9/1999 | Benjey |
| 6,158,456 A | * | 12/2000 | Enge ............................ 137/202 |

(Continued)

FOREIGN PATENT DOCUMENTS
DE   199 56 931   5/2001

(Continued)

OTHER PUBLICATIONS

U.S. Appl. No. 11/915,363, filed Nov. 23, 2007, Arnalsteen.

(Continued)

*Primary Examiner* — John Rivell
*Assistant Examiner* — Craig Price
(74) *Attorney, Agent, or Firm* — Oblon, Spivak, McClelland, Maier & Neustadt, L.L.P.

(57) ABSTRACT

A valve for the venting circuit of a liquid tank including a main chamber which opens into the tank and is connected via an aperture to the venting circuit, a float comprising a body, and a head capable of closing off the orifice. The float being able to slide vertically inside the main chamber. The valve further including a baffle surrounding the aperture and defining a secondary chamber via the bottom inside the main chamber. The dimensions and the shape of the secondary chamber, of the body of the float, and of the head of the float are designed so that the head can slide at least partly inside the secondary chamber, while the body of the float cannot do so.

17 Claims, 4 Drawing Sheets

U.S. PATENT DOCUMENTS

| | | | |
|---|---|---|---|
| 6,311,675 B2 * | 11/2001 | Crary et al. | 123/516 |
| 6,439,258 B1 | 8/2002 | Decapua | |
| 6,866,058 B1 * | 3/2005 | Brock et al. | 137/202 |
| 6,918,405 B2 * | 7/2005 | Leonhardt | 137/202 |
| 2002/0017281 A1 | 2/2002 | Crary et al. | |
| 2002/0074037 A1 | 6/2002 | Enge | |
| 2002/0124909 A1 | 9/2002 | Groom et al. | |
| 2006/0266415 A1 | 11/2006 | Ganachaud et al. | |

FOREIGN PATENT DOCUMENTS

| | | |
|---|---|---|
| DE | 1 0257223 | 6/2004 |
| EP | 0 803 671 | 10/1997 |
| EP | 1 104 713 | 6/2001 |
| EP | 1 184 221 | 3/2002 |
| FR | 2 770 464 | 5/1999 |

OTHER PUBLICATIONS

U.S. Appl. No. 12/161,348, filed Jul. 18, 2008, Arnalsteen, et al.
U.S. Appl. No. 12/297,071, filed Oct. 16, 2008, Blieux, et al.
U.S. Appl. No. 12/438,390, filed Feb. 23, 2009, Arnalsteen, et al.
U.S. Appl. No. 12/161,353, filed Jul. 18, 2008, Arnalsteen, et al.

* cited by examiner

VALVE FOR THE VENTING CIRCUIT OF A LIQUID TANK

BACKGROUND OF THE INVENTION

I. Field of the Invention

The present invention relates to a valve for the venting circuit of a liquid tank, in particular a fuel tank with which a motor vehicle may be equipped.

II. Description of Related Art

Liquid tanks, in particular fuel tanks for motor vehicles, are nowadays generally provided inter alia with a venting circuit. This circuit allows air to be introduced into the tank in the event of underpressure (especially for compensating for the volume of liquid consumed) or allows the gases contained in the tank to be removed in the event of overpressure (especially in the event of overheating). This circuit also allows the channeling and possible filtering of the gases that have to be discharged into the atmosphere, for the purpose of meeting the ever stricter environmental requirements in this regard.

The venting circuit includes, in a known manner, at least one valve that prevents, as far as possible, liquid being expelled from the tank when the tank is turned upside down or at an excessively high angle of inclination. This venting valve must provide a rapid and reliable response when these conditions arise, but with minimal sensitivity to transient phenomena such as in particular very high flow rates, overpressure in the tank or low-amplitude waves. It must also ensure that there is minimal liquid carried over into the canister (or the chamber containing a substance, usually active carbon, which adsorbs the fuel vapors) in normal operation and during filling, for fear of saturating said canister and making the decontamination of the gases discharged into the atmosphere ineffective. This phenomenon is generally called LCO (liquid carry over) in the jargon of the yield.

Many venting valves employ a float having an upper needle or tip which closes off an aperture for connecting the tank to the venting circuit. One way of reducing the risk of LCO with this type of valve is that described in application US 2002/0124909, which consists in surrounding the shaft of the valve with a baffle and providing the shaft and the valve with apertures arranged so as to force the gas to be vented into a tortuous passage allowing it to be purified of the liquid.

One drawback of this type of system is its bulkiness (total diameter of the shaft/baffle assembly). One way of solving this problem could consist in providing the valve with an internal baffle, but this would then reduce the volume available for the float to slide in, which therefore becomes "thinner", hence a larger dispersion on the liquid line and poorer reproducibility in terms of performance of the valve.

Furthermore, when the float rests in the high position (closed venting aperture) for a long time, fuel can accumulate around the aperture, on the plane surfaces present in this region (especially on the head of the float). As venting is then impossible, the pressure rises in the tank. Consequently, when the valve reopens, the instantaneous speeds are very high, hence a substantial risk of fuel droplets being carried over.

BRIEF SUMMARY OF THE INVENTION

The present invention therefore has the object of providing a valve which is less bulky and at the same time provides good performance reproducibility/precision and lower LCO risk.

For this purpose, the invention relates to a valve for a venting circuit of a liquid tank, said valve comprising:
a) a main chamber which opens into the tank and is connected via an aperture to the venting circuit;
b) a float comprising a body and a head capable of closing off the orifice, said float being able to slide vertically inside the main chamber; and
c) a baffle surrounding the aperture and defining a secondary chamber via the bottom inside the main chamber, the dimensions and the shape of the secondary chamber, of the body and of the head of the float being designed so that said head can slide at least partly inside the secondary chamber, while the body of the float cannot do so.

Such a geometry clearly has the advantage of reducing the bulk (since the baffle is internal), of providing good precision (low dispersion on the liquid line of the float since only its head is "thin") and reduced LCO risk (the region of liquid build-up being limited by the baffle). This risk may be further reduced when the head of the float has a tip substantially free of horizontal surfaces. A conical tip, whether placed on a vertical cylinder or not, is simple and gives good results.

The valve according to the invention is intended for the venting circuit of a tank that may contain any liquid. In particular, the liquid may be a fuel, a brake fluid or a lubricant. More particularly, the liquid is a fuel. The tank may be intended for any use, especially for equipping a vehicle and more especially still for equipping a motor vehicle.

The valve according to the invention includes a float consisting of a body and a head intended to close off the venting aperture. It also includes a main chamber of any shape, internally adapted to the sliding of the float, and in particular the body of the float. For this purpose, it usually has a constant internal cross section, at least in the part where the body of the float has to be able to slide. In particular, at least in this part, the chamber is internally cylindrical.

The external (lateral) shape of the body of the float is obviously matched to that of the inside of the chamber in which it has to be able to slide. Therefore in general it has a cylindrical external shape.

The valve according to the invention also includes a secondary chamber, open via the bottom inside the main chamber and bounded by a baffle.

According to the invention, the head of the float is of a size and geometry such that it can slide in the secondary chamber, whereas the body of the float cannot do so. In particular, in one embodiment, the main chamber and the secondary chamber are both cylindrical and concentric. In this embodiment, the body and the head of the float then also have a cylindrical external shell, the diameters of the main chamber ($D_{MC}$), the float body ($D_{FB}$), the secondary chamber ($D_{SC}$) and the float head ($D_{FH}$) being related via the following relationship: $D_{MC} > D_{FB} > D_{SC} > D_{FH}$.

The main chamber of the valve according to the invention preferably includes a support for the float when the latter is in the low position. The support for the float may be of any known type. Advantageously, it is an apertured plate or apertured frustoconical dish. The term "apertured" is understood to mean having several openings that allow liquid to flow through the dish in order to allow the float to fulfill its function. In particular, the frustoconical dish or the plate includes a central aperture. When the liquid level rises in the tank, this liquid penetrates the valve via the lower part, through the openings in the frustoconical dish or the plate, forces the float upward and also causes the needle to close off the aperture located in the head of the valve.

In a preferred embodiment, the main chamber of the valve according to the invention has, in its upper part, one or more lateral openings for flow of the gases, and therefore providing the degassing/venting function of the valve. The term "gas" is understood in particular to mean the external air that has to be introduced into the tank or the gas mixtures contained in the tank, the removal of which has to be possible. In the case of a fuel tank, these gas mixtures comprise essentially air, and fuel vapor.

Advantageously, the lateral openings in the main chamber are sized to have small dimensions, so as to prevent the flow of significant volumes of liquid, in particular by throttling. Typically, each opening has an area of between 10 and 20 mm$^2$. There is therefore generally a total area of between 20 and 40 mm$^2$, since the configuration with two diametrically opposed windows is preferred.

In particular, the lateral openings are of elongate rectangular cross section. Advantageously, there are at least two of these openings. This is because a single window could be blocked (by liquid fuel) at the moment when the valve reopens, for example when the tank is tilted. In this case, the risk of liquid fuel being carried over is very high, since the pressure has risen in the tank and, upon reopening, the gas flow rate is high. Complete blockage is avoided with at least two diametrically opposed apertures.

In one advantageous embodiment of the valve according to the invention, the internal baffle is also provided with at least two lateral openings. This is because the liquid which is stopped by the baffle flows along the latter so as to drain downward. Therefore, if the gas flow is able to get past the baffle only via the bottom, it will again lick up the droplets and therefore carry them over.

More particularly preferably, these openings are offset with respect to those of the main chamber. The embodiment in which openings in the internal baffle are also diametrically opposed, and staggered with those of the chamber (i.e. the four openings are arranged in the form of a cross, at 90° one with respect to another), gives good results.

The abovementioned openings in the internal baffle may be located anywhere on it. However, slots starting from the bottom of this baffle give good results as they help in the settling (draining) of the trapped liquid. These slots may even be present on more than half the height of the baffle, or indeed more than ¾ of this height.

Positioning gas flow openings in the upper part of the chamber very substantially reduces the possible impact on these openings of the liquid level and of its movements, thus allowing venting in certain critical situations. This impact may also, when required, be reduced by the use of at least one external baffle placed facing some of the openings and preferably all of them.

This may be a single baffle having a substantially annular cross section, surrounding the head of the valve. Or alternatively, it is possible to use a succession of baffles, each facing one or more openings. Preferably, it is a single baffle, preferably one that is annular and provided with openings. This is because it is preferred for the valve according to the invention to have a very high closure height (i.e. close to the upper wall of the tank) so as to use the storage volume of the tank to the maximum. This means that a passage for the gases has to be provided sufficiently high up on the valve. Now, the presence of the external baffle has the effect of lowering the uppermost entry point into the valve. To reconcile the use of this baffle with a high closure height, openings are made in this baffle. Thus, when the fuel level is very high, there is always a small passage through the slots of the baffles in order for venting of the tank to continue. Preferably, these openings are in the form of vertical slots, preferably starting from the bottom of the external baffle, for the same reasons as those mentioned in respect of the openings in the internal baffle.

As in the case of the internal baffle, the external baffle preferably includes at least two diametrically opposed openings, preferably offset with those of the chamber, and in particular staggered with respect to them.

It follows from the foregoing that, in one advantageous embodiment of the valve according to the invention, the openings of the internal and external baffles are aligned and arranged in the form of a cross with respect to those of the main chamber. This geometry, illustrated by the appended FIG. 2, prevents any direct passage between the various partitions, and therefore creates an optimum labyrinth effect.

The length of the internal baffle of the valve according to the invention is generally limited so as not to have to reduce the emerged volume of the valve excessively (i.e. to lengthen its head), and thereby increasing the risk of dispersion of its liquid line. Typically, its length is less than one third of that of the main chamber, or even less than one quarter thereof.

Likewise, the length of the external baffle is, where appropriate, limited to that required for covering the openings in the chamber. Typically, the external baffle is slightly longer than the external baffle, but does not however in general exceed one half, or even one third, of the length of the main chamber.

In the valve according to the invention, "rings" (i.e., in the broad sense, flow paths between two generally cylindrical walls) are generally provided that are sufficiently wide to let the flow of gas pass between the chamber and the internal baffle, and between the chamber and the external baffle, respectively, as the case may be. If these rings are too narrow, the droplets of trapped liquid run the risk of forming a film between the walls, which would reduce the flow area and also cause pressure in the tank to rise. The presence of liquid fuel retained in the gas passage and the rise in pressure in the tank would increase the risk of LCO.

On the other hand, too wide a ring constrains the fluid less, and there is a risk of the beneficial effect consisting in making the droplets impact on the partitions being reduced. In addition, one of the objectives of the present application is to provide a compact valve, and therefore the aim will be to minimize the diameter of the external baffle, where appropriate. In contrast, the dimensions of the internal baffle cannot be reduced too much, for fear of excessively reducing the diameter of the head of the float, hence an increased risk in dispersion of its liquid line.

Consequently, the abovementioned ring(s) preferably form the subject of optimization tests. In practice, on valves of standard dimensions (30-35 mm for the diameter of the main chamber), dimensions of around 1 mm (typically 1 to 2 mm) give good results.

The present invention applies both to a venting valve and to a filling degassing valve whose purpose is to fix the maximum fill level (FLVV or Fill Limit Venting Valve function).

The valve according to the invention therefore allows a liquid tank to be vented both in normal operation and when being filled. It does not have, as such, the function of preventing ingress of liquid in the event of a vehicle rolling over or being excessively tilted (ROV or Roll-Over Valve function), and/or the function of preventing overfilling (OFP or Overfilling Prevention function). These functions must therefore, where appropriate, be provided by independent devices or by additional means combined with the valve.

To provide the abovementioned ROV function, the means generally employed consist of a heavy ball and/or a preloaded spring. A heavy ball gives good results, in particular in combination with an apertured frustoconical dish (or perforated plate in combination with a float having a concave frustoconical bottom). In the event of the tank being inclined, this ball moves in the frustoconical dish, drives the float upward and causes the venting aperture to be closed off by the needle and the seal of the head of the valve even before the liquid level rises in the valve, thus completely preventing liquid from flowing into the venting circuit. In the event of the tank turning over, the ball of heavy material also pushes the float toward the closed position of the valve and, through gravity, keeps it in this position. The present invention therefore gives particularly good results within the context of valves with an ROV function.

As regards the OFP function, this may be provided, where required, by any of the devices known for fulfilling this function. Heavy-ball OFP devices closing off the venting aperture by gravity give good results.

Preferably, the OFP device chosen is housed in the upper part of the valve, inside the chamber, above the float. It then rests on a wall separating the valve into a top part, fulfilling the OFP function, and a bottom part, fulfilling the venting function. This wall is pierced by an aperture that is closed off by the ball below a certain pressure level in the tank. This wall is advantageously molded as a single part with the chamber of the valve.

The constituent elements of the valve may be made of any material. Preferably, they are based on a thermoplastic. In this case, it is obviously convenient to choose the material or materials in such a way that they withstand the operating stresses. In particular, the materials chosen must be inert with respect to the liquids with which they have to be in contact, in particular inert with respect to fuels.

In particular in the case in which the liquid tank is a fuel tank made of plastic, most of the constituent elements of the valve according to the invention are also made of plastic. The term "plastic" is understood to mean any polymeric synthetic material, whether thermoplastic or thermosetting, which is in the solid state under ambient conditions, as well as blends of at least two of these materials. The intended polymers comprise both homopolymers and copolymers (especial binary or ternary copolymers). Examples of such copolymers are, non-limitingly: random copolymers, linear block copolymers, non-linear block copolymers, and graft copolymers. Thermoplastic polymers, including thermoplastic elastomers, and blends thereof are preferred.

Any type of thermoplastic polymer or copolymer, the melting point of which is below the decomposition temperature, is suitable. Thermoplastics having a melting range spread over at least 10 degrees Celsius are particularly suitable. Examples of such materials include those that exhibit polydispersion in their molecular weight.

In particular, the valve according to the invention may be made of polyolefins, grafted polyolefins, thermoplastic polyesters, polyketones, polyamides and copolymers thereof.

One polymer often used in plastic fuel tanks is polyethylene, in particular high-density polyethylene (HDPE) possibly in a multilayer structure including a barrier layer (for example based on EVOH, or hydrolyzed ethylene/vinyl acetate copolymer) or one with a surface treatment (fluorination or sulfonation for example) for the purpose of making it impermeable to the fuels for which it is intended. Consequently, when the valve according to the invention includes a cover, this is preferably based on HDPE, so as also to be welded to the tank. As for the other parts of the valve, these are preferably based on at least one hydrocarbon-impermeable plastic. Examples of such hydrocarbon-impermeable plastics are, non-limitingly: polyethylene terephthalate or polybutylene terephthalate, polyamides, polyketones and polyacetals. It should be noted that all these parts, the cover included, may be multilayer structures, comprising, for example, at least one high-density polyethylene layer and optionally a hydrocarbon barrier layer (on the surface or within said structures).

In the case of a plastic fuel tank, and in particular one based on HDPE, good results have been obtained with valves, including a cover, based on HDPE, a chamber and a float made of POM (polyoxymethylene) or PBT (polybutylene terephthalate), and a seal made of a fluoroelastomer.

The method and the position for fastening the valve to the tank may be chosen in any standard manner suitable for the specific conditions. Preferably, the valve is joined directly to the upper wall of the tank and preferably by welding its cover.

DETAILED DESCRIPTION OF THE INVENTION

Figure 1:
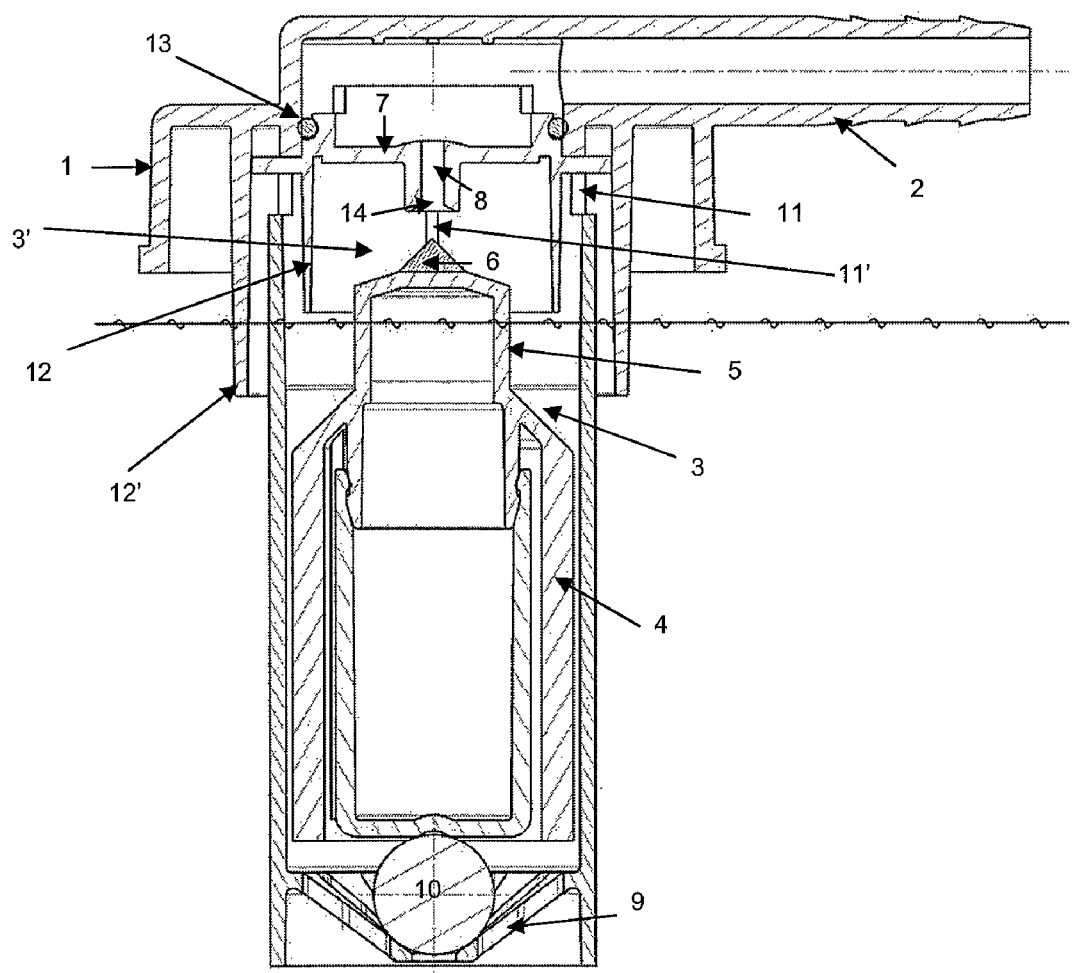
FIG. 1 shows an axial section through a venting valve according to the invention, in the open position.

FIG. 1 shows a venting valve comprising a cover (1) incorporating a venting tube (2), and a main chamber (3) which opens into the tank (not shown). A float (4, 5), shown in the low position, may slide vertically in the main chamber (3). It comprises a body (4), a head (5) produced as one part with the body (4) and provided with a conical tip (6). The liquid line of the float is indicated by way of illustration.

The main chamber (3) includes an upper wall (7) provided with a downward excrescence (8) having the venting aperture (14). The float (4, 5) can be made to move by the rise of the liquid in the valve through an apertured plate (9) or, in the case of the tank being inclined, by displacement of an ROV ball (10) of heavy material. The chamber (3) includes, in its upper part, small lateral openings (11) allowing the gases to flow but preventing substantial volumes of liquid flowing. It also includes an internal baffle (12) of annular shape, for the purpose of stopping any liquid carried over by the gases through the openings (11). It should be noted that the cover (1) is extended downward by an annular part (12'), also acting as a baffle, but an external one. The internal and external baffles are also provided with openings (11') (11").

In the valve illustrated, the cover (1) is made as one part with the external baffle (12'), the main chamber (3) and the internal baffle (12) also both being made as one part, provided beforehand with the wall (7) and then assembled by being clipped into the cover (1). An annular seal (13) makes it possible to seal off this connection.

Figure 2:
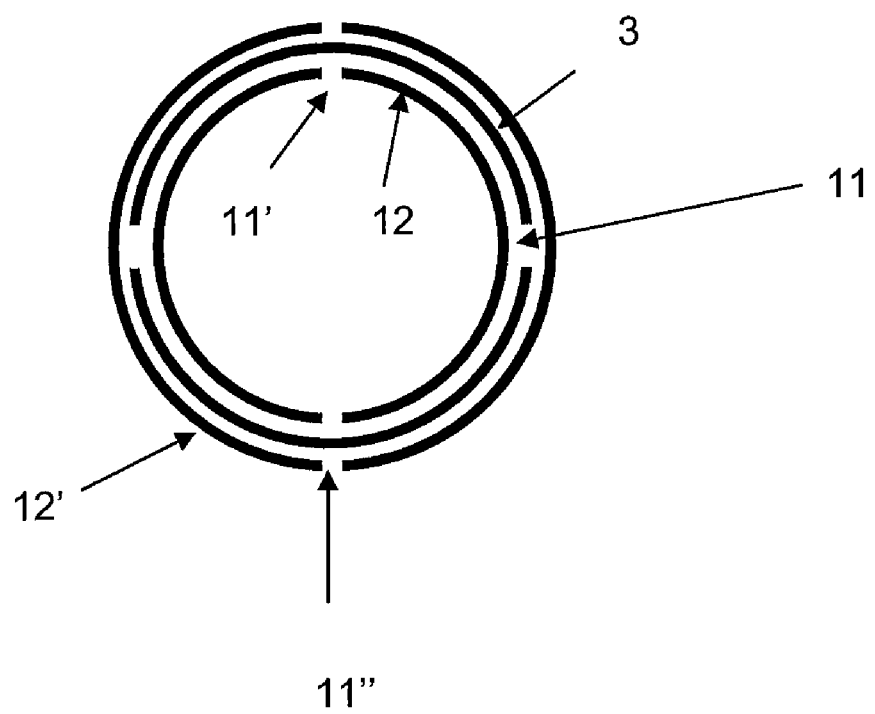
FIG. 2 shows schematically a radial section through this same valve, in the upper portion thereof.
Figure 4:
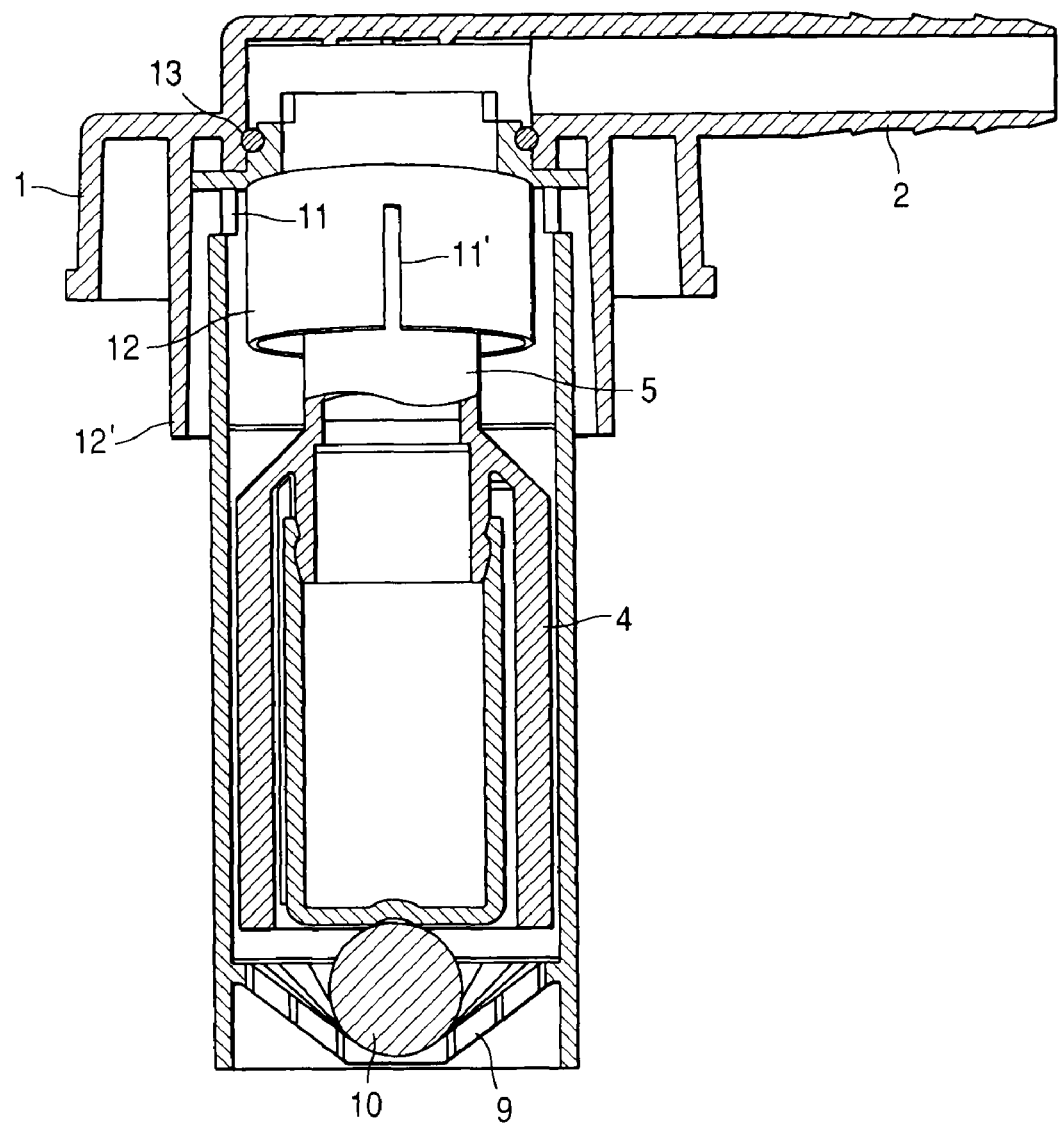
FIG. 4 is a cross-sectional view of the venting valve of FIG. 1 depicting the openings of the inner baffle.

This valve has an optimized position of the openings into the chamber (3) and into the baffles (12) (12') respectively, as illustrated in FIGS. 2 and 4, and as described above. It may be seen in FIG. 2 that the openings (11", 11 and 11') are offset by 90° respectively, going from the outer baffle (12') to the inner baffle (12), passing via the main chamber (3).

Figure 3:
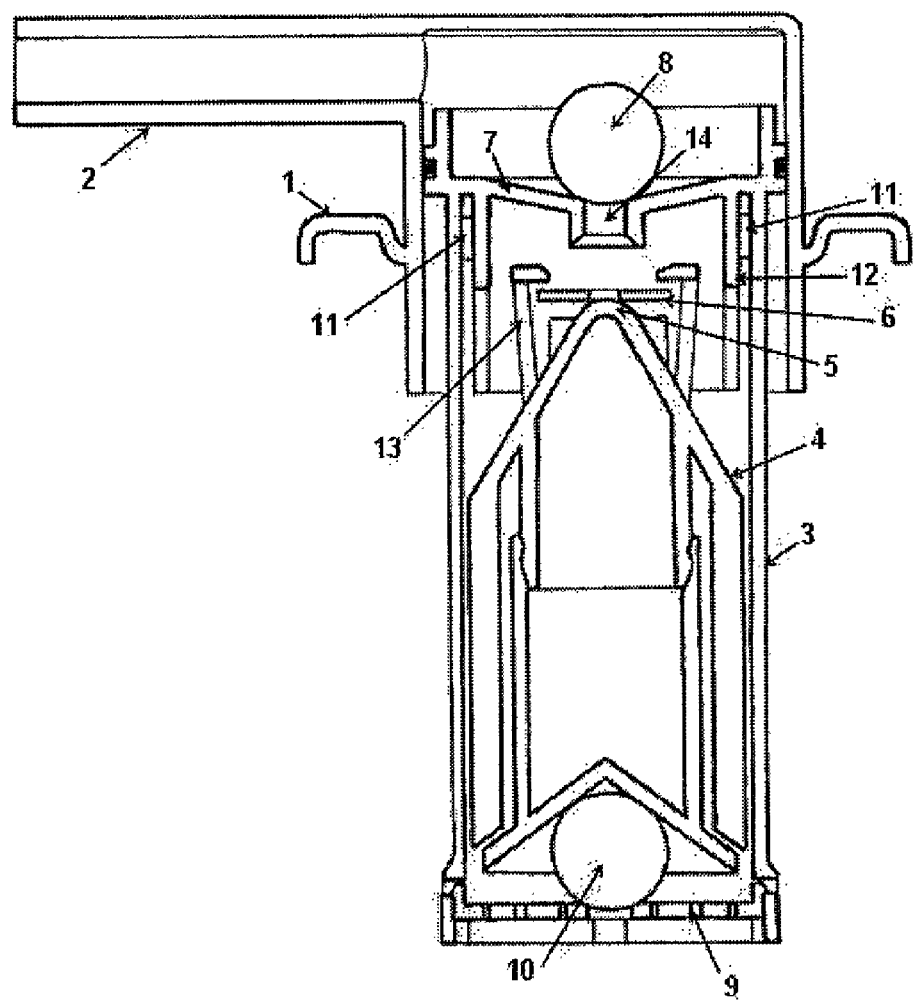
FIG. 3 shows an axial section through another valve according to the invention, again in the open position.

FIG. 3 also shows a venting valve comprising a cover (1) incorporating a venting tube (2), and a chamber (3) which opens into the tank (not shown). A float (4), shown in the low position, can slide vertically in the chamber (3) and includes a needle (5) (produced as a single part with the float) on which a seal (6) provided with an aperture rests. The role of this seal is to give the valve a two-staged opening effect (see the copending application in the name of the applicant).

The upper part of the chamber (4) is in the form of a frustoconical dish (7) and includes a movable OFP ball (8). The float (4) can be made to move by the rise of the liquid in the valve through an apertured plate (9) or, in the case of the tank being inclined, by displacement of an ROV ball (10) of heavy material.

The chamber (3) includes, in its upper part, small lateral openings (11) allowing the gases to flow but preventing substantial volumes of liquid flowing. The chamber also includes an internal baffle (12) of annular shape, for the purpose of stopping any liquid carried over by the gases through the openings (11). It should be noted that the cover (1) is extended downward by an annular part, also acting as a baffle, but an external one. The head of the float (4) is provided with hooked fingers (13) defining a kind of hollow cage around the needle (5), in which cage the seal (6) can move.

The invention claimed is:

1. A valve for a venting circuit of a liquid tank, the valve comprising:
    a housing including a main chamber which opens into the liquid tank and is connected via an aperture to venting circuit, the housing including at least two openings;
    a float comprising a body and a head capable of closing off the aperture, the float being able to slide vertically inside the main chamber;
    a baffle surrounding the aperture and defining a secondary chamber open via a bottom inside the main chamber, the baffle including at least two lateral openings and an outer side that covers the at least two openings of the housing; and
    a second baffle defining an external chamber open via a bottom, an inner side of the second baffle covering the at least two openings of the housing and including at least two lateral openings that are circumferentially offset with respect to the at least two openings of the housing, wherein
    dimensions and shapes of the secondary chamber, the body of the float, and the head of the float are such that the head of the float can slide at least partly inside the secondary chamber, while the body of the float cannot slide inside the secondary chamber.

2. The valve as claimed in claim 1, wherein the head of the float has a substantially conical tip.

3. The valve as claimed in claim 1, wherein:
    the main chamber and the secondary chamber are both cylindrical and concentric;
    the body and the head of the float have a cylindrical external shell; and
    diameters of the main chamber, the body of the float, the secondary chamber, and the head of the float are related via the following relationship:

$$D_{MC} > D_{FB} > D_{SC} > D_{FH}.$$

4. The valve as claimed in claim 1, wherein the housing includes an upper part provided with at least two lateral openings, the at least two lateral openings of the upper part being the at least two openings of the housing.

5. The valve as claimed in claim 1, wherein the at least two lateral openings of the baffle are slots starting from a bottom of the baffle.

6. The valve as claimed in claim 1, wherein the at least two lateral openings of the baffle and the at least two lateral openings of the housing are circumferentially offset one with respect to another.

7. The valve as claimed in claim 1, wherein the at least two lateral openings of the second baffle are slots starting from a bottom of the second baffle.

8. The valve as claimed in claim 1, wherein the at least two lateral openings of the second baffle are provided in a lateral surface of the second baffle to communicate the inner side of the second baffle with an outer side of the second baffle.

9. The valve as claimed in claim 1, wherein the at least two lateral openings of the baffle are provided in a lateral surface of the baffle to communicate an inner side of the baffle with an outer side of the baffle.

10. The valve as claimed in claim 1, wherein the at least two lateral openings of the baffle are provided on more than ½ of a height of the baffle.

11. The valve as claimed in claim 1, wherein the at least two lateral openings of the baffle are provided on more than ¾ of a height of the baffle.

12. The valve as claimed in claim 11, wherein the slots are vertical slots extending vertically from the bottom of the baffle up to more than ½ of a height of the baffle.

13. The valve as claimed in claim 6, wherein the at least two lateral openings of the baffle and the at least two lateral openings of the housing are diametrically offset by 90° with respect to one another.

14. The valve as claimed in claim 1, wherein the at least two lateral openings of the second baffle and the at least two openings of the housing are diametrically offset by 90° with respect to one another.

15. The valve as claimed in claim 12, wherein the slots are vertical slots extending vertically from the bottom of the baffle up to more than ¾ of the height of the baffle.

16. The valve as claimed in claim 1, wherein the second baffle is located around the outside of an upper part of the housing, the second baffle extending from a top of the housing toward a bottom of the housing to cover the at least two openings of the housing.

17. The valve as claimed in claim 4, wherein the upper part of the housing includes a lateral surface and the at least two lateral openings of the housing are located at an uppermost end of the lateral surface.

* * * * *